United States Patent [19]

Dietrich, Sr. et al.

[11] Patent Number: 4,546,832
[45] Date of Patent: Oct. 15, 1985

[54] AGRICULTURAL IMPLEMENT WITH SPRING CUSHION FOR VERTICALLY ADJUSTABLE SUBFRAME

[75] Inventors: William J. Dietrich, Sr., Congerville; Cary L. Sizelove, Eureka, both of Ill.

[73] Assignee: DMI, Inc., Goodfield, Ill.

[21] Appl. No.: 534,564

[22] Filed: Sep. 22, 1983

[51] Int. Cl.$^4$ ............................................. A01B 61/00
[52] U.S. Cl. ................... 172/260.5; 172/491; 172/500
[58] Field of Search ............... 172/491, 464, 260.5, 172/264, 265, 506, 500, 466, 413, 463

[56] References Cited

U.S. PATENT DOCUMENTS

| | | | |
|---|---|---|---|
| 2,300,192 | 10/1942 | Allen | 172/464 X |
| 2,720,147 | 10/1955 | Simrose | 172/464 X |
| 2,778,290 | 1/1957 | Greeson | 172/413 |
| 3,126,689 | 3/1964 | Walker | 172/491 X |
| 3,566,974 | 3/1971 | Kopaska | 172/491 |
| 3,602,102 | 8/1971 | Ferari | 91/438 |
| 3,825,073 | 7/1974 | Gardner | 172/705 |
| 4,245,706 | 1/1981 | Dietrich | 172/196 |
| 4,249,614 | 2/1981 | Lely | 172/260.5 |

Primary Examiner—Richard J. Johnson
Attorney, Agent, or Firm—Emrich & Dithmar

[57] ABSTRACT

An agricultural implement has a main pull-type frame carrying a first set of ground-engaging tillage tools and a subframe carrying a second set of tillage tools. A lift mechanism including an hydraulic cylinder operated from the operator's position on the tractor pulling the implement adjusts the height of the subframe relative to the main frame to set the working depth of the tools on the subframe. A preload spring cushion mechanism is interposed between the main frame and the hydraulic cylinder to permit the subframe to lift for smaller obstacles and be reset by the spring without actuating the pressure relief valve. The force of the spring assists in resetting the subframe to its desired working depth after the obstacle is passed. In the illustrated embodiment, the spring cushion mechanism has an increasing moment arm as the spring compresses thereby to equalize the resetting force applied to the lift mechanism; and it is preloaded so that the operator can adjust the operating depth of the subframe. The hydraulic system includes a pressure relief bypass valve actuated at a predetermined pressure to permit fluid to flow between the rod and butt ends of the cylinder, permitting the cylinder to extend and the subframe to raise when a larger obstacle is encountered by the tools on the subframe.

10 Claims, 5 Drawing Figures

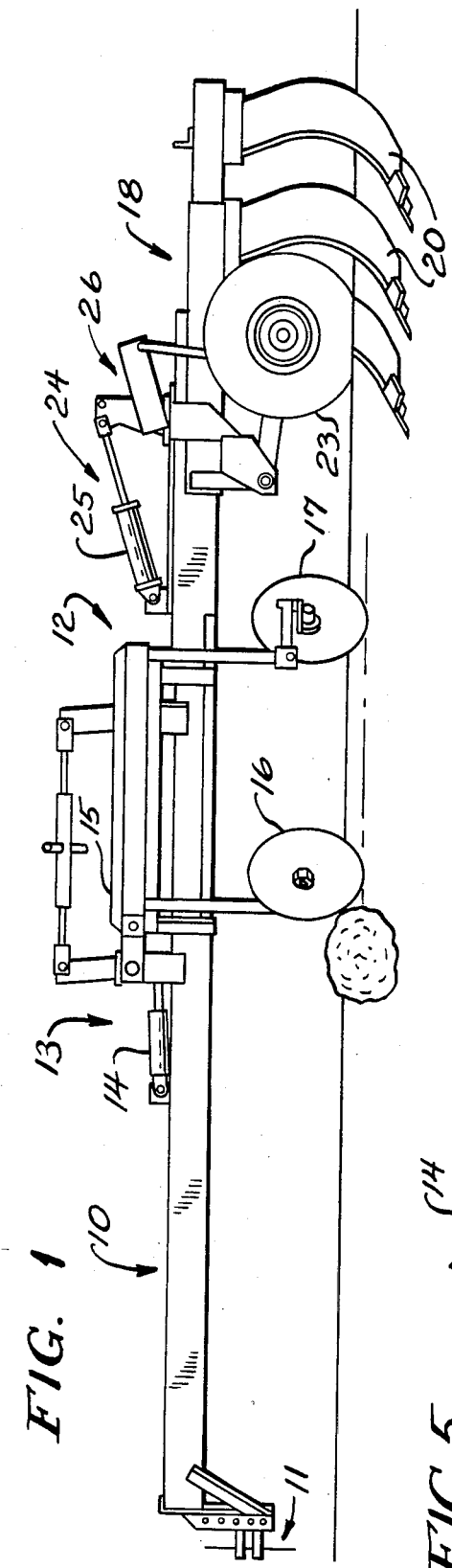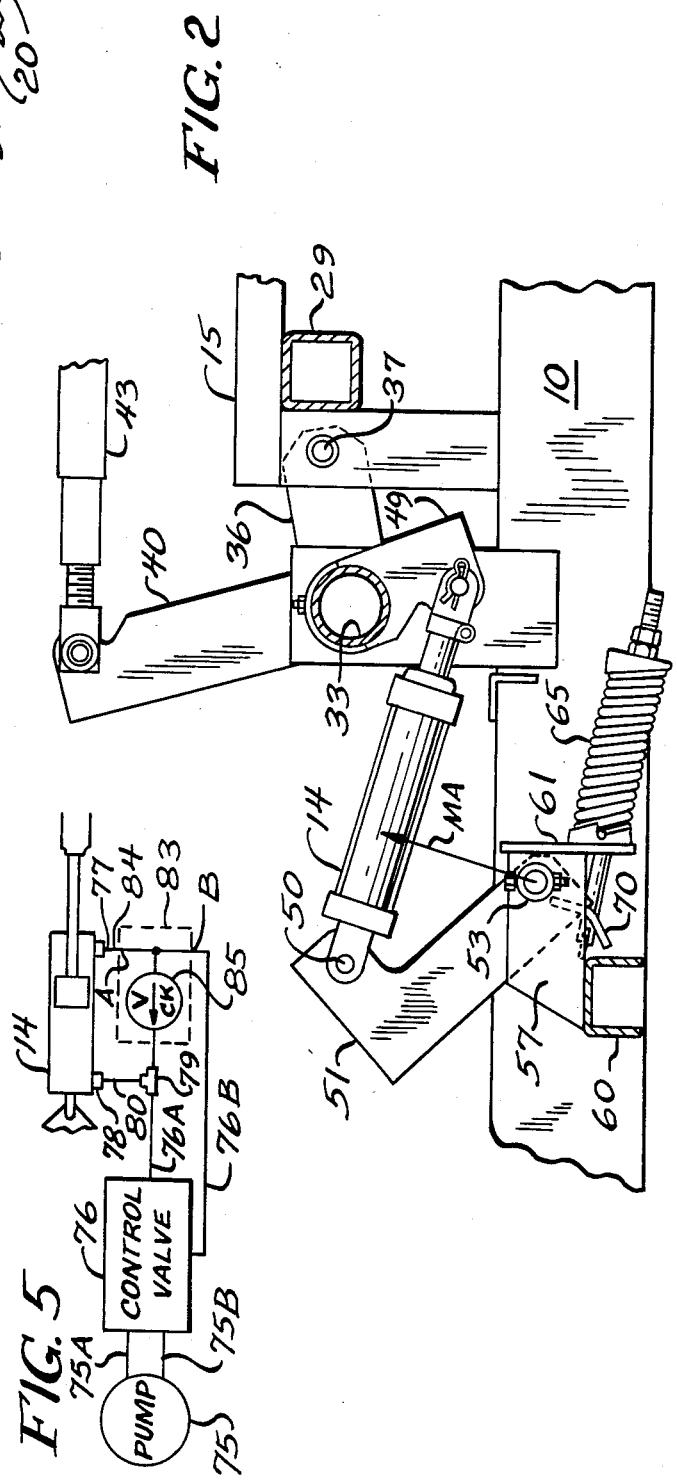

AGRICULTURAL IMPLEMENT WITH SPRING CUSHION FOR VERTICALLY ADJUSTABLE SUBFRAME

BACKGROUND OF THE INVENTION

The present invention relates to agricultural tillage implements; and more particularly, to a tillage implement having a vertically adjustable subframe.

Apparatus of this type has, in recent years, become a popular alternative to tillage practices which have existed for decades, such as moldboard plowing. These more recently popularized implements include a main frame provided with support wheels and including a first set of tillage tools. The working depth of these tools is set normally by an hydraulic cylinder operated from the tractor which adjusts the height of the main frame relative to the support wheels. A subframe is carried by the main frame, normally in a forward position; and it includes a second set of tillage implements and an independently operated lift linkage which also includes an hydraulic cylinder for setting the working depth of the tools on the subframe. In this manner, the working depth of both sets of tools may be separately adjusted to the desired level. One such system is disclosed in U.S. Pat. No. 4,245,706 of William J. Dietrich, Sr., issued Jan. 20, 1981 and owned by the assignee of this application.

One of the major problems encountered in the field by a tillage implement is breakage or damage when the machine encounters an obstruction in the field, such as a rock. If a rock is large and near the surface, and the farmer misses seeing it in time, it can actually cause breakage of parts of the implement. In some instances, such as moldboard plows, reset mechanisms, some of which are automatic, are used so that each plow unit is separately equipped with its own protection mechanism. In lighter tillage apparatus, such as chisel plows or cultivators, a spring cushion mechanism may be employed on each separate tool, permitting it to be raised when it encounters an obstruction, and then to be reset under force of the spring after the obstruction is passed.

In the case of implements of the type described having an independently adjustable subframe, the working depth of the tools mounted on the subframe is typically set by a lift mechanism including a double-acting hydraulic cylinder. Once the working depth is set, the lift mechanism becomes rigid. The individual tools carried by the subframe may be provided with their own cushion mechanism, but such mechanisms are limited in the amount of vertical tool displacement they can accomodate and they add to the cost of the machine.

Thus, even where a spring cushion mechanism is provided for each tool, when a large obstacle is encountered, there is an upward force on the subframe which is transmitted through the lift linkage and hydraulic cylinder tending to lift the entire implement. The resulting shock can be damaging, considering the high speed at which lighter tillage apparatus is sometimes pulled, and further considering the tendency to use wider, and therefore heavier, machines to minimize the number of passes required to work a given field. The problem is even further exacerbated in implements where the rear tools are chisel plows or cultivator points because the force resisting vertical displacement of the machine includes not only the entire weight of the machine, but the force required to lift the points from their working positions. That force is truly considerable and damage can easily result. Provision was made for overcoming this problem in the implement described in the application of William J. Dietrich, Sr. for TILLAGE APPARATUS HAVING A VERTICALLY ADJUSTABLE SUBFRAME, Ser. No. 365,783, filed Apr. 5, 1982, now abandoned. In that system, a pressure relief valve is included in the hydraulic cylinder circuit for the subframe lift linkage. If an excessive lifting force is encountered by the subframe, the force is applied to the hydraulic cylinder tending to cause it to extend, which would permit the subframe to raise in response to the presence of the obstacle. This force is translated to a pressure in the rod end of the lift hydraulic cylinder; and if that pressure exceeds a predetermined value, a pressure relief valve is actuated to enable fluid to flow from the rod end of the cylinder to the butt end of the cylinder and permit the cylinder to elongate and the subframe to raise.

The solution to the problem afforded by the pressure relief valve described above is considered a significant advance because it does prevent damage to the implement. However, because fluid flows from the rod end of the cylinder to the butt end in overcoming the obstacle, the effect is to lengthen the cylinder so that the subframe does not reset to its original position. This is not a major problem in the operation of the implement because it simply requires that the operator actuate the hydraulic control valve to reset the subframe to its desired operating depth. Fortunately, farmers are sensitive to the operation of a tillage implement and readily sense when it has encountered a large obstacle; and the small inconvenience of resetting the operating depth of the subframe is more than compensated by the reduction in damage to the implement when a large obstruction is encountered.

SUMMARY OF THE INVENTION

The present invention provides a further improvement over the system disclosed in the above-described application Ser. No. 365,783. Briefly, according to the invention, a spring cushion mechanism is interposed between the main frame and the hydraulic cylinder for the subframe. The spring cushion mechanism includes a lever arm connected to a sleeve which rotates about a pin mounted to the main frame. The butt end of the hydraulic cylinder is pivotally mounted to the lever arm. The sleeve, and hence, the lever arm, is connected to a coil spring assembly in such a manner that as one of the tools on the subframe encounters an obstacle tending to raise the subframe, the hydraulic cylinder, without changing its length, rotates the lever arm thereby compressing the spring. The spring thus provides a resetting force for the lift mechanism which is actuated for smaller clearances and which resets the subframe to its desired operating depth without having to re-adjust the hydraulic cylinder. The hydraulic cylinder is still provided with a pressure relief valve, as before, so that if an obstacle is encountered so large that the spring cushion mechanism will not accommodate it, damage is nonetheless prevented by actuating the pressure relief valve and causing the hydraulic cylinder to extend to accommodate further upward, clearing motion of the subframe.

In a preferred embodiment, the moment arm of the force exerted on the cylinder to reset the subframe after it has encountered an obstacle increases, thus partially compensating for the increased force exerted by the spring due to its increased compression as the subframe raises. This results in a more equalized resetting force on the subframe. In other words, the amount of force necessary to raise the subframe and the tools mounted on it by a given distance is approximately the same whether the subframe is in the working position or in a higher position, so long as the compression spring has not bottomed out.

The present invention thus responds more quickly to obstacles encountered in the soil than the pressure relief valve alone, and therefore reduces the shock forces applied to the subframe and its associated lift mechanism. Further, the present invention obviates the need of the operator to reset the lift frame each time an obstacle is encountered, and is particularly useful in fields which contain a large number of rocks.

The spring cushion mechanism is pre-loaded so that it does not compress until a predetermined force is encountered. This enables the operator to transfer some of the weight of the machine to the tools on the subframe to ensure operation at the desired depth, yet the subframe responds to a force sufficient to overcome the preload on the spring cushion mechanism.

An advantage of the present invention is that a single spring cushion assembly can be used to protect and cushion the entire subframe including a large number of individual tools. This is more economical than providing individual spring cushion assemblies for each of the tools on the subframe.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a right side elevational view of an apparatus incorporating the present invention;

FIG. 2 is a fragmentary vertical cross-sectional view showing the lift mechanism for the subframe with the spring cushion assembly fully actuated;

FIG. 5 is a schematic diagram of the hydraulic control circuit for the subframe lift mechanism.

DETAILED DESCRIPTION OF THE DRAWING

Figure 3:
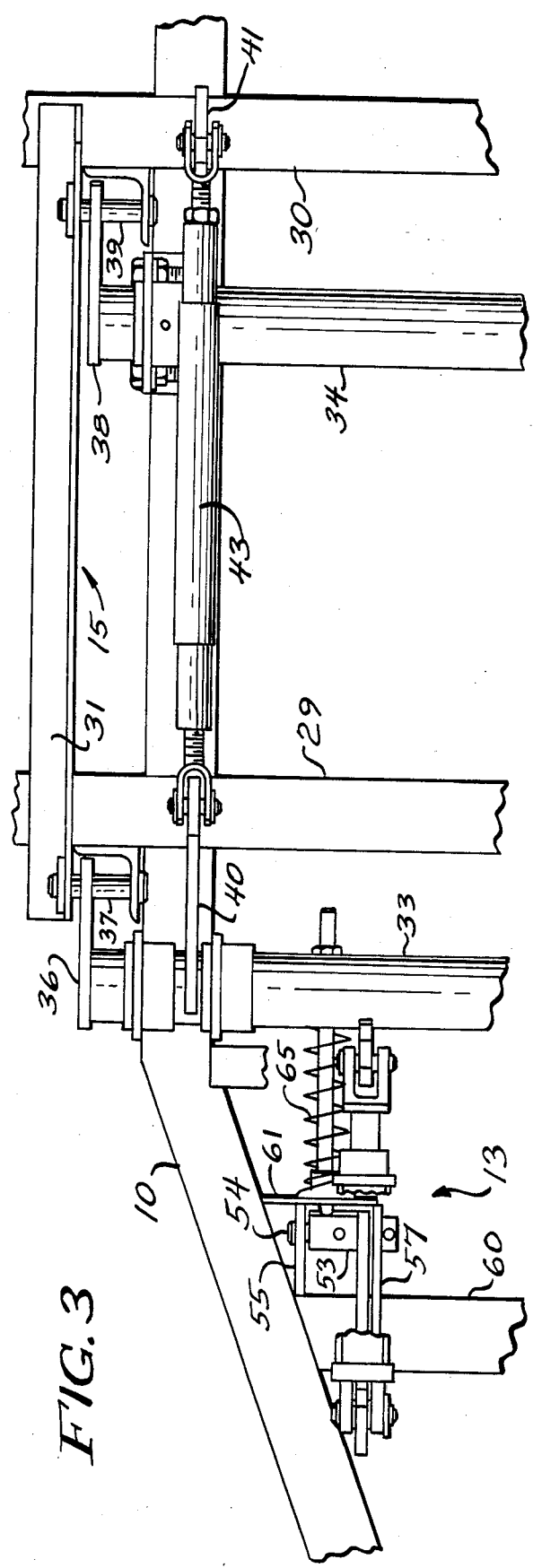
FIG. 3 is a fragmentary plan view of the lift mechanism and subframe.

Referring first to FIG. 1, a tillage machine includes a main or draft frame generally designated 10 having, at its forward end, a conventional hitch 11 for connecting to a tractor.

A subframe generally designated 12 is mounted to the main frame 10 at an intermediate position. A subframe lift mechanism generally designated 13 including an hydraulic cylinder and piston rod unit 14 is adapted to adjust the height of the subframe 12 relative to the main frame 10, in a manner to be described in more detail below. The subframe 12, as viewed from the top, is in the form of a box frame 15 and carries a forward line of disk blades 16 and a rear line of disk blades 17.

The rear of the main frame 10 includes a rigid chevron-shaped frame generally designated 18 which carries a set of chisel plows 20.

The main frame 10 is supported by a pair of support wheels, one of which is seen at 23; and a main frame lift mechanism generally designated 24 and including an hydraulic cylinder 25 and a rear rock shaft assembly 26 is provided for raising the main frame 10 relative to the ground, and thereby adjusting the working depth of the chisel plows 20.

Figure 4:
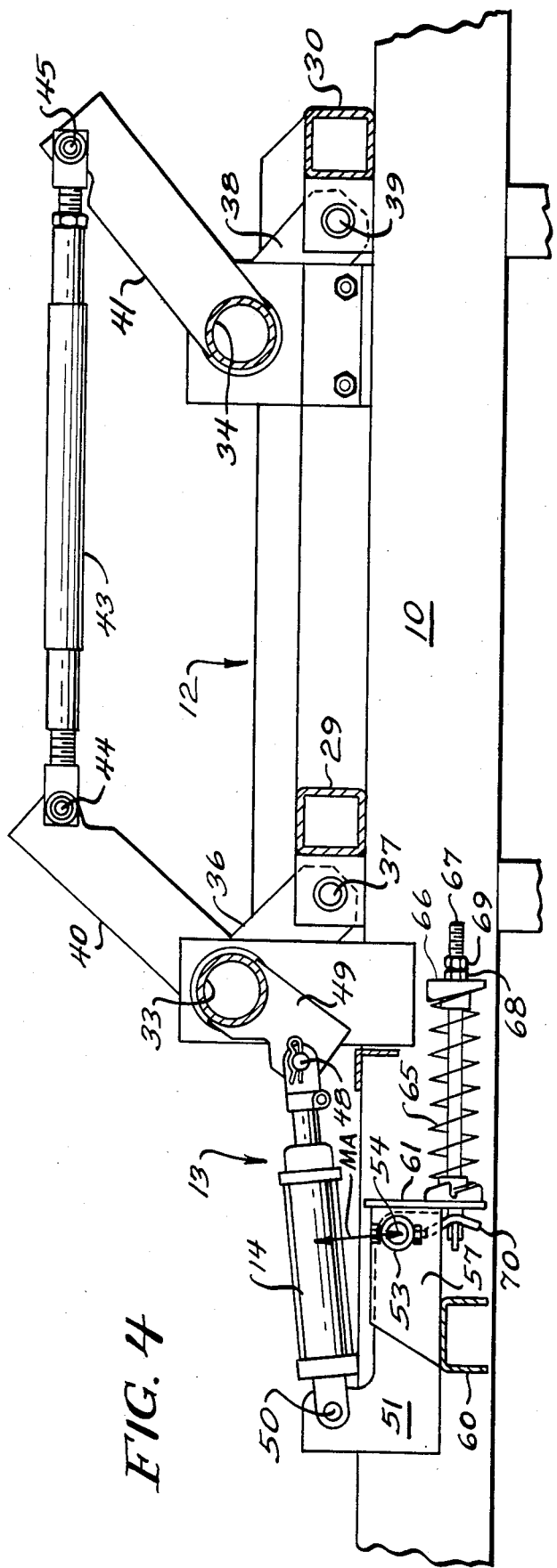
FIG. 4 is a fragmentary vertical cross-sectional view of the lift mechanism and subframe with the cushion assembly in its normal state.

Turning now to FIGS. 3 and 4, the subframe 12 includes a forward mounting bar 29 on which the forward disk blades 16 are mounted, and similar rear mounting bar 30 for the rear set of disk blades 17. Transverse braces such as the angle iron 31 are provided as needed to form the subframe; and the disk blades are conventionally mounted, and need not be provided with individual spring cushions.

The lift mechanism 13 for the subframe includes a forward rock shaft 33 and a rear rock shaft 34 mounted for rotation to the main frame 10.

A first shaft arm 36 is rigidly mounted to the outboard end of the forward rock shaft 33; and the distal end of the shaft arm 36 is pivotally mounted by means of a pin 37 to the subframe assembly 12. A similar shaft arm 38 is rigidly connected to the rear rock shaft 34 and pivotally connected to the subframe assembly 12 by means of a pin 39.

Crank arms 40, 41 are also rigidly mounted to the rock shafts 33, 34; and their distal ends are pivotally mounted respectively to the forward and rear ends of a turn-buckle connecting link 43, the pivotal connections being shown in FIG. 4 and designated 44 and 45 respectively.

As seen in FIGS. 3 and 4, only the right side of the subframe assembly 12 and its associated lift mechanism is seen; however, similar shaft arms, crank arms and connecting links may also be provided on the left side of the apparatus or separately on wings, in the case of a large, multi-section implement.

The rod end of the hydraulic cylinder 4 is pivotally connected by means of a pin 48 to a crank arm 49 which is rigidly attached to the forward rock shaft 33. The butt end of the cylinder 14 is pivotally connected at 50 to a lever arm 51 in the form of a "L". The lever arm 51, in turn, is rigidly mounted to a sleeve 53 which journals a pin 54. The pin 54 is mounted at one side to a bracket 55 which is welded to the frame 10, and at the other side to a bracket 57 which is welded to a cross frame member 60 of the frame 10. The rear (right side as seen in FIG. 3) of the brackets 55, 57 are welded to a plate 61 which may also be welded to the frame 10, and which acts as an abutment for one end of a coil spring 65. The other end of the coil spring 65 is held by a cap 66 which, in turn, is held to a spring bolt 67 by means of a nut 68 and a jam nut 69.

The other end of the spring bolt 67 is secured through a slot to a pivot plate 70 which is welded to the sleeve 53, as best seen in FIG. 4.

The hydraulic control circuit for the hydraulic cylinder 14, seen in FIG. 5, may be the same as that disclosed in the above-referenced application Ser. No. 365,783. Briefly, an hydraulic pump 75 is energized by the engine of the tractor; and it has a pressurized output line 75A and a return line 75B, as is known. Both lines are connected to a two-way control valve 76 which is preferably located to be easily accessible by the operator of the tractor while he is driving. The valve 76 similarly has two output lines designated 76A and 76B for convenience. The control valve 76 is a conventional valve having a "raise" position in which the pressure line 75A is connected to the output line 76A which, in turn, is connected by means of a tee 79 and an hydraulic line 80 to an input port 78 at the butt end of the cylinder 14. When this connection is made, the cylinder extends and causes the rock shafts 33, 34 to rotate counterclockwise when viewed from the left as in FIG. 4, thereby raising the subframe 12 relative to the main frame 10. This also raises the disk blades, causing them to operate at a shallower depth setting. With the control 76 in the raised position, the hydraulic line 76B is coupled by means of the valve 76 to the return line 75B, permitting fluid from the rod end of the cylinder 14 to be returned to the sump input of the pump 75.

Hydraulic line 76B is connected to an input B of a pressure relief bypass valve shown diagrammatically within the dash block 83. A second port A of the bypass valve 83 is connected by means of an hydraulic line 84 to the rod end of the cylinder 14. The bypass valve 83 includes a pressure-actuated check valve 85, the output of which is coupled by means of an hydraulic line to the tee 79.

When the control valve 76 is placed in the "lower" position, the input pressure line 75A is connected to the line 76B, and the hydraulic line 76A is connected to the return line 75A. Pressurized fluid is forced by the pump 75 through the lines 76B and 84; and the fluid flows through the bypass valve 83 directly from port B to port A and thence through line 84 to cause the hydraulic cylinder 14 to retract. This rotates rockshafts 33 and 34 clockwise and lowers the subframe.

OPERATION

After the operator has set the proper operating depth of the chisel plows 20 through operation of hydraulic cylinder 25 (which is actuated by a second, conventional control valve not illustrated), he sets the depth of the disk blades to their desired operating depth by actuation of the control valve 76 of FIG. 5, as described. When the disk blades are at their desired operating depth, the control valve 76 is set to a neutral position in which the lines 76A, 76B are terminated—that is, they do not communicate with the pump 75 at all; and hydraulic fluid cannot flow through them. In this condition, should one of the disk blades strike a rock such as is illustrated in FIG. 1, there is an upward force on the disk blade which encounters the rock. This will cause an immediate and direct upward force on the subframe 12; and the four-bar linkage effect on the box frame 15 caused by the two rock shafts and their associated arms and connecting link 43, will try to maintain the subframe in a horizontal position.

The upward force on the subframe will be exerted through pin 37 and crank arm 36 to cause rock shaft 33 to tend to rotate counterclockwise in FIG. 4. This, in turn, will generate a force through crank arm 49 and pin 48 that will tend to elongate the cylinder 14. That is, the cylinder will be placed in tension. This tension force, in turn, will be transmitted through pin 50 to tend to rotate lever arm 51. Before lever arm 51 begins to rotate, however, the preload on spring 65 must be overcome. This preload is determined by many design variables such as weight and strength of materials, but is is important because it is the preload on the spring together with the hydraulic cylinder 14 and the rigid four-bar linkage described which enables the operator to transfer some of the weight of the main frame to the subframe in setting the disks at the desired operating depth. In other words, during a first range of upward force on the subframe, the spring cushion mechanism acts like a rigid link until the preload on spring 65 is overcome.

After that preload is overcome, additional upward force on the subframe will cause lever arm 51 and sleeve 53 to rotate clockwise about pin 54. Bracket 70 will, in turn, also rotate clockwise about pin 54 since it is welded to the sleeve 53; and this action will draw the spring shank 67 through the plate 61 and cause spring 65 to compress further, thereby creating a reset force on the linkage supporting the subframe after the obstruction is passed.

If the obstruction is small enough, depending upon the dimensions and actual geometry of the subframe and associated adjusting linkage, so that the disk 16 clears the obstruction before the spring 65 bottoms (the limit position being shown in FIG. 2), then the force of the spring 65 will cause the mechanism to reset the discs to the depth at which they had previously been operating prior to encountering the obstruction. If, on the other hand, the obstruction is so large that the spring 65 bottoms (or nears bottoming out), then further upward force on the subframe will be sensed by the pressure relief valve 83, which opens and permits the oil in the rod end of the piston 14 to flow through the check valve 85 to the butt end of the cylinder. This enables the cylinder to lengthen so that the subframe can rise above the obstruction, but it also requires that the operator reset the cylinder after the obstruction is passed. This is accomplished by manipulation of control valve 76 at the operator's position.

Turning now to FIG. 2, the lift mechanism is shown in the limit position for a given extension of the lift cylinder 14. That is, the frame 15 is raised as it encounters an obstruction; causing the rock shaft 32 to rotate counterclockwise and the lever arm 51 to rotate clockwise. This compresses the spring 65 by rotation of the sleeve 53 and the spring bracket 70 to the position shown in FIG. 2. By comparing FIGS. 2 and 4, it will be observed that the moment arm designated MA (which is the perpendicular distance between the axis of the cylinder 14 and the axis of rotation of the lever arm 51) has increased from the original position of FIG. 4 to the activated position of FIG. 2. That is, the resetting force of the spring 65 is applied to the spring bracket 70, sleeve 53 and lever arm 51 through the cylinder 14 to the crank arm 49. The moment arm for force application, however, has increased even though the resetting force of the spring has increased, thereby creating a more equalized or constant resetting force than if the moment arm were fixed. It is not necessary for operation that the resetting force applied to the rocker arm 33 remain absolutely constant, nor is any such assertion made. However, by virtue of the structure illustrated, the resetting force is made more constant than if the moment arm did not increase, and the resetting force would continue to increase as the spring is compressed in a manner proportionate to the compression without this provision.

In order to reset the operating depth of the subframe, by increasing the length of the cylinder 14, it will be appreciated from FIG. 4 that cross frame member 60 acts as a stop for the lever arm 51 and therefore provides a reference in setting the operating depth of the tools on the subframe.

After reaching the limit position of FIG. 2, the spring cushion mechanism can, of course, yield no further because the spring 65 has bottomed. Any further upward force on the subframe 12 can be relieved only by actuation of the pressure relief valve 83 in the manner described. That is, continued upward force on the subframe creates a torque on the rock shaft 33 causing it to tend to rotate counterclockwise and thereby placing the piston 14 under additional tension force. That tension will create pressure in hydraulic line 84 and the valve 83 will sense that pressure. If the pressure in line 84 exceeds that preset pressure at which the valve is actuated, fluid will flow from the rod end of the cylinder 14 to the butt end, bypassing control valve 76 and permitting the cylinder to elongate. As explained above, this obviates breakage of the lift mechanism, the cushion spring mechanism, the subframe, the tools and their shanks.

In summary, for an initial range of upward force on the subframe 12, the cylinder 14, four-bar linkage and spring cushion mechanism are rigid. This advantageously enables the operator to "load" the subframe by transferring the weight of the main frame to it. If the upward force exceeds that first range, as when a smaller object is struck, the spring 65 compresses linearly with the height of the subframe, but the reset force does not increase at the same rate, although it will increase some, due to the increased moment arm effect described. Finally, if a larger object is struck and the operating range of the spring cushion mechanism is exceeded, pressure relief valve 83 is actuated and the cylinder 14 elongates to avoid damage or breakage of the machine.

Having thus described in detail a preferred embodiment of the invention, persons skilled in the art will be able to modify certain of the structure which has been illustrated or to substitute equivalent elements for those disclosed while continuing to practice the principle of the invention; and it is, therefore, intended that all such modifications and substitutions be covered as they are embraced within the spirit and scope of the appended claims.

We claim:

1. In an agricultural implement including a main frame adapted to be pulled by a tractor; a first set of tillage tools carried by said main frame; support wheel means for supporting said main frame; a subframe carried by said main frame; a second set of tools mounted to said subframe; subframe lift mechanism including an hydraulic cylinder connecting said subframe to said main frame for adjusting the elevation of said subframe relative to said main frame while maintaining said subframe generally parallel to said main frame, the improvement comprising: a spring cushion mechanism connected with said hydraulic cylinder between said main frame and subframe and including a spring, means for preloading said spring, a lever arm for compressing said spring when said second set of tools encounter an obstruction tending to lift said subframe, said spring compressing in response to said obstruction and acting to reset said subframe to its adjusted working depth after said obstruction is passed, and pressure-actuated hydraulic bypass valve means actuated at a predetermined fluid pressure for communicating the rod end of said cylinder with said butt end thereof, in response to an upward force on said subframe greater than a predetermined amount for permitting said cylinder to extend after said spring cushion mechanism has reached the limits of design operation.

2. The apparatus of claim 1 wherein said subframe lift mechanism includes a rock shaft journaled on said main frame; linkage means interconnecting said subframe with said rock shaft for effecting a four-bar linkage movement of said subframe relative to said main frame; a crank arm rigidly connected to said rock shaft and pivotally connected at its distal end to one end of said hydraulic cylinder; said lever arm of said spring cushion mechanism being pivotally connected at one end to the second end of said hydraulic cylinder and at its other end to said main frame for pivotal motion relative to said main frame.

3. The apparatus of claim 2 further comprising a stop means on said main frame for limiting the pivotal motion of said lever arm in one direction to limit the downward displacement of said subframe relative to said main frame for a given adjusted length of said hydraulic cylinder.

4. The apparatus of claim 3 further comprising a sleeve attached to said second end of said lever arm for journaling the same to said main frame; a spring bracket connected to said sleeve; a spring-abutment plate for fixing the position of one end of said spring; and a spring bolt having one end fixed to the movable end of said spring and its other end connected to said spring bracket for compressing said spring as said sleeve rotates in response to the rotation of said lever arm as said subframe is lifted.

5. The apparatus of claim 1 wherein said lever arm is pivotally connected to one of said frames at one end and said lever arm, pivotal connection and hydraulic cylinder are constructed and arranged such that the moment arm exerted by said lever arm to reset said subframe changes as the compression force on said spring increases thereby to equalize the resetting force applied to said subframe lift mechanism.

6. The apparatus of claim 5 characterized in that said moment arm increases as said spring force increases.

7. In an agricultural implement including a main frame adapted to be pulled by a tractor; a first set of tillage tools carried by said main frame; support wheel means for supporting said main frame; a subframe carried by said main frame; a second set of tools mounted to said subframe, the improvement comprising: subframe lift mechanism including an hydraulic cylinder and rigid four-bar linkage means for connecting said subframe to said main frame for adjusting the elevation of said subframe relative to said main frame while maintaining said subframe generally parallel to said main frame; a spring cushion mechanism connected with said hydraulic cylinder between said main frame and subframe and including a spring; means for preloading said spring and an arm for compressing said spring when said subframe is lifted; and pressure-actuated hydraulic bypass valve means actuated at a predetermined fluid-pressure for communicating the rod end of said cylinder with the butt end thereof; said apparatus being constructed and arranged such that (a) for a predetermined initial range of upward force on said subframe, said hydraulic cylinder, linkage means and spring cushion mechanism are rigid, (b) for a predetermined range of greater upward force on said subframe sufficient to overcome said preload, said spring is compressed to permit said subframe to raise to clear smaller objects and to generate a reset force for said subframe, and (c) for a predetermined still larger upward force on said subframe, said valve means is actuated to permit said cylinder to change its length and thereby to enable said subframe to raise further and clear larger objects.

8. The apparatus of claim 7 further comprising a lever arm connected to said hydraulic cylinder and responsive to said reset force to change the moment arm through which said reset force is applied in such a manner as to compensate for increases in compression of said spring and equalize the reset force on said subframe.

9. In an agricultural implement including a main frame adapted to be pulled by a tractor; support wheel means for supporting said main frame; a subframe carried by said main frame; a set of tillage tools mounted to said subframe; subframe lift mechanism including an hydraulic cylinder connecting said subframe to said main frame for adjusting the elevation of said subframe relative to said main frame while maintaining said subframe generally parallel to said main frame, the improvement comprising: a spring cushion mechanism connected with said hydraulic cylinder between said main frame and subframe and including a spring, means for preloading said spring, a lever arm for compressing said spring when said set of tools encounter an obstruction tending to lift said subframe thereby to compress, said spring acting to reset said subframe to its adjusted working depth after said obstruction is passed, said spring, lever arm and hydraulic cylinder being constructed and arranged such that as said subframe is raised when said tools encounter an obstacle, said spring compresses while the reset moment arm through which the force of said spring is applied to reset said subframe increases thereby to equalize the reset force on said subframe even though the force of said spring increases.

10. The apparatus of claim 9 further comprising pressure-actuated hydraulic by-pass valve means actuated at a predetermined fluid pressure for communicating the rod end of said cylinder with the butt end thereof in response to an upward force on said subframe greater than a predetermined amount, thereby permitting said cylinder to change in length after said spring cushion mechanism has reached the limits of its operation.

* * * * *